2,997,744
METHOD OF GRAPHITE PREPARATION

Stephen D. Stoddard, Los Alamos, N. Mex., and Wallace T. Harper, Indian Village, Ga., assignors to the United States of America as represented by the United States Atomic Energy Commission
No Drawing. Filed Sept. 19, 1957, Ser. No. 685,049
1 Claim. (Cl. 18—55)

This invention relates to a method for producing homogeneous graphite compacts and in particular to a method for producing graphite compacts of high density.

The theoretical maximum density of a graphite compact is 2.25 gms./cc. In the nuclear reactor art there is considerable interest in producing a graphite having a density as close to the theoretical maximum as possible as an increase in a graphite density can result in a decrease of reactor core size with a corresponding decrease in shielding, etc. However, graphite, as produced by all means now known in the art, cannot achieve maximum density because of gas occlusions which appear in the manufacturing process, primarily in the graphitizing of the material. It is therefore a problem in graphite manufacture to keep the number and size of bubbles or gas occlusions as small as possible in an effort to achieve high density. In the conventional means of graphite manufacture it is difficult to achieve a density greater than 1.7 as no method of direct control of gas occlusions has, prior to this invention, been found.

By the conventional method of graphite manufacturing the raw materials must first be baked by slow and uniform heating followed by slow cooling. After baking and cooling the piece is graphitized by heating to about 2500° C. by a process which normally takes from a day to several weeks depending on the size, and produces a graphite of a density of about 1.6 gms./cc. To make a graphite of density greater than about 1.6, the graphite piece is placed in an evacuated chamber so that the gas occlusions are evacuated and a filler such as coal tar pitch is forced into the evacuated occlusions under pressure. The piece is then regraphitized but, of course, the coal tar pitch will shrink and occlusions will still be present although smaller in size. The impregnation operation can be repeated until a density of about 1.8 is reached, or through very expensive effort, a density of 2 may be reached.

Attempts have been made to substitute other procedures in the graphitizing manufacture in order to achieve a higher density through simpler means. For example, one method of the prior art comprises heating the raw materials under pressure during the carbonization process. This method is satisfactory for producing a carbon piece but since means for heating a carbon piece during subsequent graphitizing to eliminate occlusions was not understood, this process was not adaptable for producing graphite but only for producing carbon pieces. The many advantages of graphite over carbon are well known in the art so that the aforementioned scheme has not been suitable for solving the problem of a high density preparation.

The methods of the prior art for producing graphite have, as noted above, required a number of steps which are time consuming and costly. In addition to the need of graphite of high density there has been a need for producing graphite by simpler means than has previously been known.

By the method of this invention the steps of baking, graphitizing, pressurizing with coal tar pitch, rebaking and regraphitizing can be reduced to one simple step, yet graphite with a density of up to 1.92 can be produced in one heating cycle. The present inventors have found that it is possible to prepare a graphite with a small number of gas occlusions in one simple step.

It is therefore an object of this invention to show a method for producing a high density, high strength graphite in one continuous step.

Another object of this invention is to produce a graphite piece in one continuous step having high dimensional stability.

Another object of this invention is to provide a method for producing graphite conveniently, rapidly and without flaws.

Another object of this invention is to provide a method for producing a graphite piece of finished size and shape in one simple step.

Further objects of this invention will be apparent from the following specification and appended claim.

By the method of this invention a special die is charged with a mixture of either petroleum coke or graphite flour, coal tar pitch and carbon black, and subjected to a pressure of from 1200 to 1500 p.s.i. while the mixture is heated continuously through the baking and graphitizing temperature. Thus while maintaining a very high pressure on the mixture to be graphitized the usual expansion during graphitizing has been prevented. This results in a graphite having a density up to 1.92 gms./cc. by means much more economical than the present industrial practice. If desired the finished graphite piece can be subjected to the usual impregnation of coal tar pitch under pressure by the customary means previously described to raise its density to an even greater value. Further, the graphite prepared by the method of this invention is approximately 20 percent stronger than the usual graphites of the prior art.

An additional and important advantage of the method of the present invention is that the finished piece will be of the exact size required, i.e., the final dimension of the piece will conform to the die cavity thru all stages.

In practicing this invention if it is desired to use coke as the basic principal raw material, either calcined coke or raw coke may be used. In the prior art, it is necessary to use the more expensive calcined coke as raw coke expands too much to allow a high density piece to be formed.

By the method of the present invention it is possible to prepare a graphite piece from the raw materials in about one and one-half to two hours total elapsed time. By the method of the prior art it is customary to expect a total elapsed time of up to several weeks from raw material to finished graphite piece.

It should be pointed out that it is not sufficient to merely confine the mixture to be graphitized through the baking operation alone. If this is done, and the piece graphitized unrestrained, warpage, puffing and distortion will occur with simultaneous shrinking. Thus the desired dimension cannot be achieved without machining. Since the graphitizing temperature is above or at least as great as the melting point of most metals, i.e., 2500° C. or thereabouts, the materials in which the piece may be restrained are rather limited. It has been found that a graphite die is very suitable for this purpose and the typical dimensions for a die for producing a 1″ graphite cylinder would be, for example, length of die equal to the length of the desired piece plus 2″, outside diameter of the die 4″. The inside surface of the die may be coated with the colloidal suspension of graphite (Aquadag) to aid in the removal of the graphite piece. The die plunger should be graphite.

Typical mixtures of raw materials are as follows:

Table I

| Ingredient: | Parts by weight |
| --- | --- |
| Graphite flour | 66 |
| Coal tar pitch | 26 |
| Carbon black | 8 |

Table II

| Raw coke | 55 |
| --- | --- |
| Coal tar pitch | 30 |
| Carbon black | 15 |

By this invention it is possible to prepare 100 percent pure graphite pieces and, if desired, other materials such as metals may be mixed with the graphite during the manufacture of the graphite. By conventional methods it is difficult to add other materials to graphite because of differences in their expansion coefficients causing unrestrained pieces to crack during the heating process. This is probably caused by the formation of metal carbides which differ in volume from the metal and graphite.

It is understood in practicing this invention that certain variations may be introduced without altering its advantages or scope. For example, calcined coke can be substituted for graphite flour as well as other materials, substitutions which will, by this process, ultimately become graphite. Therefore, the invention is not limited by the above specification but only by the appended claim.

What is claimed is:

A method for producing graphite objects comprising mixing coal tar pitch, carbon black and a material selected from the class comprising raw coke, calcined coke, and graphite flour, placing said mixture in a graphite mold, pressurizing said mixture to at least 1200 p.s.i., and baking and graphitizing said mixture by heating said mold and contents to a temperature of about 2500° C. while maintaining said pressure.

References Cited in the file of this patent

UNITED STATES PATENTS

| 687,893 | Marshall | Dec. 3, 1901 |
| --- | --- | --- |
| 1,091,616 | Arsem | Mar. 31, 1914 |
| 1,158,171 | Brown | Oct. 26, 1915 |
| 1,714,165 | Gilbert | May 21, 1929 |
| 2,125,588 | Ridgway | Aug. 2, 1938 |